US012609534B2

(12) United States Patent
Pulikanti et al.

(10) Patent No.: US 12,609,534 B2
(45) Date of Patent: Apr. 21, 2026

(54) METHOD OF REGULATING FREQUENCY OF PLURALITY OF UNINTERRUPTIBLE POWER SUPPLY UNITS AND CORRESPONDING UNINTERRUPTIBLE POWER SUPPLY UNIT

(71) Applicant: ABB SCHWEIZ AG, Baden (CH)

(72) Inventors: Sridhar Pulikanti, Napier (NZ); Simon Walton, Hastings (NZ); Robert Turner, Hastings (NZ); Nick Elliott, North Hastings (NZ)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/761,432

(22) Filed: Jul. 2, 2024

(65) Prior Publication Data

US 2024/0356338 A1 Oct. 24, 2024

Related U.S. Application Data

(63) Continuation of application No. PCT/EP2022/053511, filed on Feb. 14, 2022.

(51) Int. Cl.
*H02J 3/40* (2006.01)
*H02J 9/06* (2006.01)
(52) U.S. Cl.
CPC ............... *H02J 3/40* (2013.01); *H02J 9/062* (2013.01)

(58) Field of Classification Search
CPC .................................... H02J 3/40; H02J 9/062
USPC .......................................................... 307/65
See application file for complete search history.

(56) References Cited

U.S. PATENT DOCUMENTS

| | | | |
|---|---|---|---|
| 3,515,894 A | 6/1970 | Swing et al. | |
| 6,803,679 B1 | 10/2004 | Luo et al. | |
| 10,447,072 B2 * | 10/2019 | Familiant | H02J 9/06 |
| 2017/0077747 A1 | 3/2017 | Paatero | |

FOREIGN PATENT DOCUMENTS

DE 2319319 A1 10/1974

* cited by examiner

*Primary Examiner* — Richard Tan
(74) *Attorney, Agent, or Firm* — Greenberg Traurig, LLP

(57) ABSTRACT

A method of regulating frequency of plurality of uninterruptible power supply units and corresponding uninterruptible power supply (UPS) unit. The method includes broadcasting, to a controller of a UPS unit, an expected synchronization direction to other UPS units via a communication link, the expected synchronization direction being determined based on a frequency of the corresponding UPS units and a frequency of a grid. The method includes obtaining the expected synchronization directions of other UPS units via the communication link; determining a major synchronization direction based on the expected synchronization direction of each UPS unit; and regulating a frequency of each UPS unit based on the major synchronization direction.

12 Claims, 2 Drawing Sheets

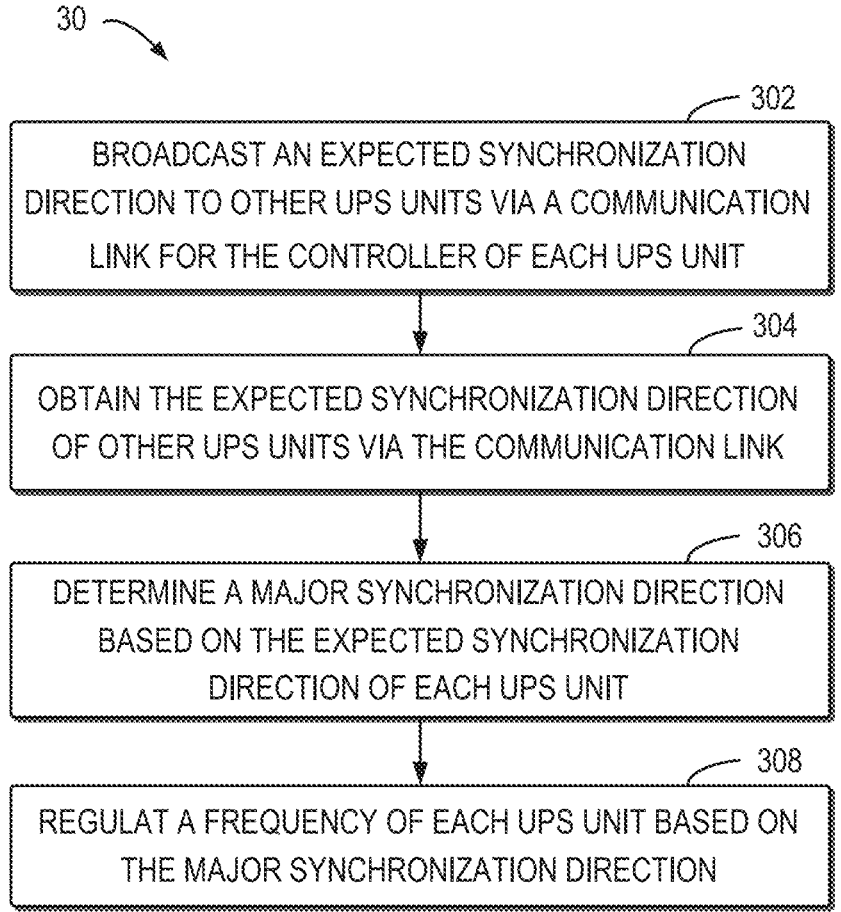

30

302

BROADCAST AN EXPECTED SYNCHRONIZATION DIRECTION TO OTHER UPS UNITS VIA A COMMUNICATION LINK FOR THE CONTROLLER OF EACH UPS UNIT

304

OBTAIN THE EXPECTED SYNCHRONIZATION DIRECTION OF OTHER UPS UNITS VIA THE COMMUNICATION LINK

306

DETERMINE A MAJOR SYNCHRONIZATION DIRECTION BASED ON THE EXPECTED SYNCHRONIZATION DIRECTION OF EACH UPS UNIT

308

REGULAT A FREQUENCY OF EACH UPS UNIT BASED ON THE MAJOR SYNCHRONIZATION DIRECTION

Fig. 3

METHOD OF REGULATING FREQUENCY OF PLURALITY OF UNINTERRUPTIBLE POWER SUPPLY UNITS AND CORRESPONDING UNINTERRUPTIBLE POWER SUPPLY UNIT

CROSS-REFERENCE TO RELATED APPLICATIONS

This application claims priority to and is a continuation application of international patent application number PCT/EP2011/053511, filed on Feb. 14, 2022, which is herein incorporated by reference in its entirety.

FIELD

Example embodiments of the present disclosure generally relate to the field of uninterrupted power supply and, more particularly, to a method of regulating frequency of a plurality of uninterrupted power supply units and a corresponding uninterrupted power supply.

BACKGROUND

Uninterruptible power supply (UPS) is important electrical equipment, which provides stable power supply for electrical facilities. The UPS mainly operates in two modes, i.e., a power conditioning mode and an island mode. When the input connected to the UPS, which is grid, is stable, the UPS works under the power conditioning mode and provides a desired power for the output connected to the UPS, which is load. When the grid fails, the UPS would work under the island mode and act as a voltage source for the load, supplying power from the batteries. The two modes can be switched by a switch comprised in the UPS. When the switch is closed, the UPS is in the power conditioning mode, and controls the output voltage magnitude and frequency by regulating the power change between the UPS and the power source. When the power quality events occur, the switch is opened and the UPS transits to the island mode. In this island mode, the load active power flows through an inverter from the energy storage and the UPS controls the output voltage with given voltage magnitude and frequency.

Conventionally; the UPS may include a plurality of UPS units. When the grid voltage is recovered and then UPS transitions from the island mode to the power conditioning mode, there would be some inconsistencies among the UPS units. For example, each UPS unit may make different decisions on whether to change modes from island mode to power conditioning mode based on the unit local information; or each UPS unit may make their transition decisions at different instants; or the moment synchronization initiation will differ). Such inconsistencies may cause problems and should be tackled.

Therefore, there is a need for achieving synchronization among a plurality UPS units in the UPS.

SUMMARY

Example embodiments of the present disclosure propose a solution to at least address the problems in the prior art and/or the potential problems.

Embodiments of the present disclosure relate to a method of regulating frequencies of a plurality of UPS units, each UPS unit comprising a controller, the method comprising: for the controller of each UPS unit, broadcasting an expected synchronization direction to other UPS units via a communication link, the expected synchronization direction being determined based on a frequency of the corresponding UPS units and a frequency of a grid; obtaining the expected synchronization directions of other UPS units via the communication link; determining a major synchronization direction based on the expected synchronization direction of each UPS unit; and regulating a frequency of each UPS unit based on the major synchronization direction.

According to embodiments of the present disclosure, the synchronization among the UPS unit can be achieved.

In some embodiments, in response to determining a difference of a phase angle between the corresponding UPS unit and the grid is within an angle inhibit band, applying a drift frequency to the frequency of the UPS unit, the angle inhibit band being within a range around 180 degrees.

In some embodiments, regulating the frequency of each UPS unit comprising: in response to determining that the frequency of the UPS unit is greater than the frequency of the grid, decreasing the frequency of the UPS unit to the same of the frequency of the grid.

In some embodiments, regulating the frequency of each UPS unit comprising: in response to determining that the frequency of the UPS unit is smaller than the frequency of the grid, increasing the frequency of the UPS unit to the same of the frequency of the grid.

In some embodiments, the range is selected from 5 to 15 degrees.

In some embodiments, the communication link is a communication bus.

Embodiments of the present disclosure relate to an uninterruptible power supply, comprising: a switch arranged between a load and a power source, the power source configured to supply power to the load; a power management module comprising a main energy storage; an inverter arranged between and coupled to the power management module and the load; and a controller coupled to the power management module, the inverter and the switch, the controller configured to: broadcast an expected synchronization direction to other UPS units via a communication link for the controller of each UPS unit, the expected synchronization direction being determined based on a frequency of the corresponding UPS units and a frequency of a grid; obtain the expected synchronization direction of other UPS units via the communication link; determine a major synchronization direction based on the expected synchronization direction of each UPS unit; and regulate a frequency of each UPS unit based on the major synchronization direction.

In some embodiments, the controller is configured to apply a drift frequency to the frequency of the UPS unit in response to determining a difference of a phase angle between the corresponding UPS unit and the grid is within an angle inhibit band, the angle inhibit band being within a range around 180 degrees.

In some embodiments, the controller is further configured to: decrease the frequency of the UPS unit to the same of the frequency of the grid in response to determining that the frequency of the UPS unit is greater than the frequency of the grid.

In some embodiments, the controller is further configured to: increase the frequency of the UPS unit to the same of the frequency of the grid in response to determining that the frequency of the UPS unit is smaller than the frequency of the grid.

In some embodiments, the range is ranged from 5 to 15 degrees.

In some embodiments, the communication link is a communication bus.

BRIEF DESCRIPTION OF THE DRAWINGS

Through the following detailed description of the example embodiments of the present disclosure with reference to the accompanying drawings, the above and other objectives, features and advantages of the present disclosure will become more apparent. In the drawings, a plurality of embodiments of the present disclosure is explained in a non-restrictive manner by way of examples, wherein:

FIG. 3 illustrates a method of regulating frequencies of a plurality of UPS units in accordance with example embodiments of the present disclosure.

DETAILED DESCRIPTION OF EMBODIMENTS

Figure 1:
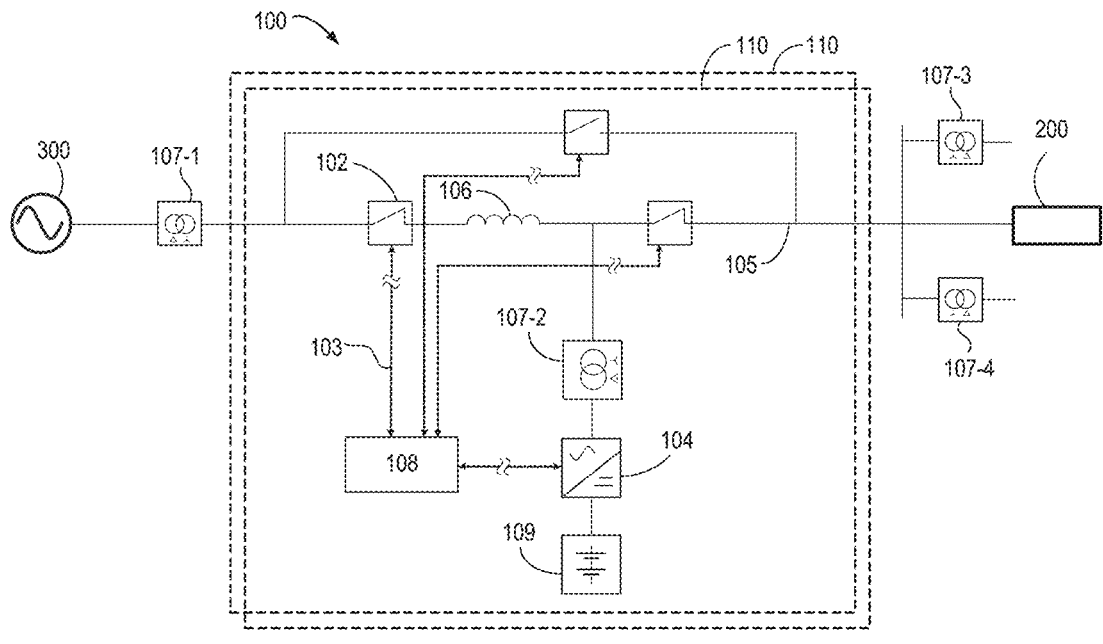
FIG. 1 illustrates an example usage scenario of an uninterruptible power supply in accordance with an example embodiment of the present disclosure.

Principles of the present disclosure will now be described with reference to various example embodiments illustrated in the drawings. It should be appreciated that description of those embodiments is merely to allow those skilled in the art to better understand and further implement example embodiments disclosed herein and is not intended to limit the scope disclosed herein in any manner. It should be noted that similar or same reference signs can be used in the drawings when feasible, and similar or same reference signs can represent the similar or same functions. Those skilled in the art can readily recognize that alternative embodiments of the structure and method described herein can be employed from the following description without departing from the principles of the present disclosure described herein.

As used herein, the term "comprises" and its variants are to be read as open-ended terms that mean "comprises, but not limited to." The term "based on" is to be read as "based at least in part on." The terms "one embodiment" and "embodiment" are to be read as "at least one embodiment." The term "a further embodiment" is to be read as "at least a further embodiment." The terms "first", "second" and so on can refer to same or different objects. The following text also can include other explicit and implicit definitions. Definitions of the terms are consistent throughout the description unless the context indicates otherwise.

FIG. 1 shows an example usage scenario of an uninterruptible power supply 100 in accordance with an example embodiment of the present disclosure. The scenario as shown in FIG. 1 is called a hard-parallel configuration. The uninterruptible power supply 100 according to an embodiment may be a medium voltage uninterruptible power supply, which is a type of impedance isolated static converter. It is to be understood that this type of uninterruptible power supply 100 is merely an example without suggesting any limitation as to the scope of the present disclosure.

As shown in FIG. 1, the uninterruptible power supply 100 is connected at a downstream side (also referred to as "load side") to a load 200 and at an upstream side (also referred to as "power supply side") to a power source 300. In this embodiment, the power source 300 is a grid supply, which provides a utility voltage. It is to be understood that the power source 300 may be other types of power sources. The load 200 and the power source 300 are interconnected by a power bus 105, which comprises cables or bus bars. The power bus 105 in this embodiment is considered as part of the uninterruptible power supply 100, although the power bus 105 can also be part of a system installation for interconnecting the power source 300 and the load 200. It is also to be understood that the load 200 may comprise individual load units, which are individually connected to the power bus 105. These load units together form the load 200.

As illustrated in FIG. 1 the dash lines represent that there are a plurality of UPS units 110 comprised in the uninterruptible power supply 100. The UPS units 110 may be the same. It is to be understood that the UPS unit 110 may be slightly different from each other but together form the uninterruptible power supply 100. Each UPS unit 110 is connected to other UPS unit 110 via a communication bus (not shown). With the communication bus, the UPS unit 110 can share some information (e.g., the frequency or phase angle of each UPS unit 110) with the other UPS unit 110. In this manner, each UPS unit 110 would know the frequency or phase angle of the other UPS unit 110.

The internal configuration of the UPS unit 110 will be described hereinafter. As illustrated in FIG. 1, the UPS unit 110 comprises a switch 102 which is arranged in the power bus 105 between the power source 300 and the load 200. The UPS unit 110 further comprises a power management module 109. The power management module 109 comprises an energy storage to supply power for the load 200. The UPS unit 110 may further comprise an inverter 104. The inverter 104 may be arranged between the power management module 109 and the load 200 and also coupled to the power management module 109 and the load 200. In some embodiments, the uninterruptible power supply 100 may further comprise a plurality of coupling transformers 107-1, 107-2, 107-3 and 107-4 configured to perform voltage adaptations as required.

In the shown embodiment, the UPS unit 110 also comprises a controller 108. The controller 108 is configured to control the performance of the UPS unit 110. In other example embodiments, the controller 108 may also be configured to monitor the power source for power quality events. The controller 108 is separated from other components of the UPS unit 110. In an alternative embodiment, the inverter 104 may be provided integral with the controller 108.

As shown in FIG. 1, the controller 108 may be connected to the switch 102, the inverter 104 via a communication connection 103. In this shown embodiment, the power management module 109 is also connected to the controller 108 via the communication connection 103. The communication connection 103 may be an industrially robust, low latency and/or long distance communication link, for example. The communication connection 103 is provided as a communication bus, to which all the components of the UPS unit 110 are connected to. In an alternative embodiment, all the components of the UPS unit 110 are individually connected to the controller 108.

In general, the uninterruptible power supply 100, which includes a plurality of UPS units 110, is configured to supply power to the load 200 in case of a power quality event, e.g., when the power source 300 fails. As used herein, a power quality event may refer to any event that may endanger the operation of the load 200, in particular voltage drops, complete failures of the power source 300, or voltage disturbances in the power source 300. It is to be understood that the uninterruptible power supply 100 described herein is only for illustration without suggesting any limitations as to the scope of the subject matter.

Figure 2:
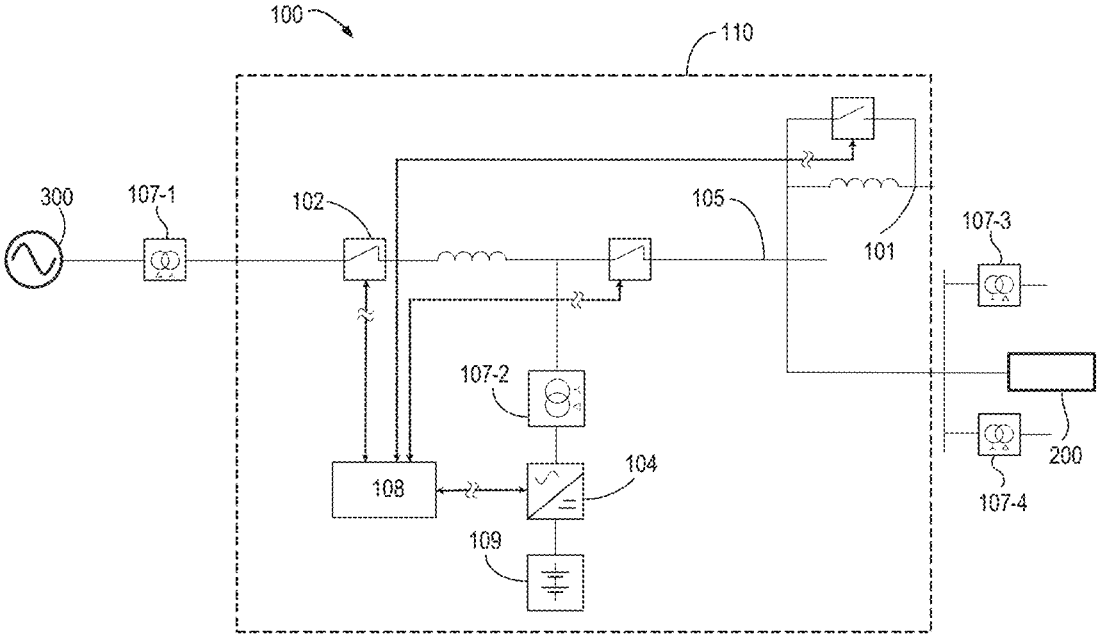
FIG. 2 illustrates another usage scenario of an uninterruptible power supply in accordance with an example embodiment of the present disclosure.

FIG. 2 shows another usage scenario of an uninterruptible power supply 100 in accordance with an example embodiment of the present disclosure. The scenario as shown in FIG. 2 is called a soft-parallel configuration or ring bus configuration. FIG. 2 differs from FIG. 1 in that FIG. 2 only shows one UPS unit 110 in the common ring bus configuration and the multiple UPS units in this configuration share the common grid connection and are also all connected on the ring-bus port 101.

FIG. 3 illustrates a method 30 of regulating frequencies of a plurality of UPS units in accordance with example embodiments of the present disclosure.

At block 302, for each UPS unit 110, the controller 108 is configured to broadcast an expected synchronization direction to other UPS units via a communication link. In some example embodiments, the expected synchronization direction may indicate a forward direction or a backward direction. The expected synchronization direction may be determined according to the difference between the current frequency of the corresponding UPS units 110 and the frequency of the grid 300. If the frequency of the UPS unit 110 is higher compared to the frequency of the grid 300 then the UPS phase rotates slightly faster than the grid 300. If the UPS unit 110 wishes to synchronize its phase to the grid 300 and deems that its phase is lagging behind the phase of the grid 300, then the UPS unit 110 can increase its frequency temporarily to "catch up" its phase to the grid 300. This is called a forward direction. In other example embodiments, the expected synchronization direction may indicate positive frequency offset or negative frequency offset Each UPS unit 110 can broadcast its expected synchronization direction towards other UPS units 110. At block 304, the controller 108 is configured to obtain the expected synchronization directions of other UPS units 110 via the communication link.

At block 306, the controller 108 is configured to determine a major synchronization direction based on the expected synchronization direction of each UPS unit 110. For example, if the uninterruptible power supply 100 includes nine UPS units and three of all nine UPS units 110 wish to synchronize forward while other six UPS units 110 wish to synchronize backwards, then the majority are ones that wish to synchronize backwards, then the backward direction is chosen as the major synchronization direction. As a result, all nine UPS units 110 will follow the major synchronization direction and synchronize backwards. In this situation, those six UPS units 110 will keep their expected synchronization directions but those three UPS units 110 have to change their expected synchronization directions to keep consistency with the majority of UPS units 110. It is to be understood that the numbers of the UPS units 110 listed herein are merely example without suggesting any limitation as to the scope of the present disclosure.

At block 308, the controller 108 is configured to regulate the frequency of each UPS unit 110 based on the major synchronization direction to allow the UPS unit 110 to keep pace with the frequency of the grid 300. Once the phase of the UPS unit 110 has caught up to the grid 300 it is therefore now synchronized, and the UPS unit 110 would set its frequency to the same to the phase of the grid 300. In this way, the phase of the UPS unit 110 then does not differ from the phase of the grid 300.

In some embodiments, if the controller 108 determines that the frequency of the UPS unit 110 is greater than the frequency of the grid 300, then the frequency of the UPS unit 110 is decreased to the same of the frequency of the grid 300. If the controller 108 determines that the frequency of the UPS unit 110 is smaller than the frequency of the grid 300, then the frequency of the UPS unit 110 is increased to the same of the frequency of the grid 300.

According to the present disclosure, each UPS unit 110 shares its expected synchronization direction and all UPS units 110 decide to go the synchronization direction of the majority. With these arrangements, during the synchronization process, the tracking of frequency of all UPS units 110 can be globally managed to have common frequency. The power unbalance among UPS units 110 can be minimized.

In other example embodiments, during the synchronization process, the tracking of the phase angle of all UPS units 110 can be globally managed to have common frequency. In this way, the phase angle of all UPS units 110 converges with phase angle of the grid 300 with minimal circulating currents.

When the plurality of parallel UPS units are 180 degrees out of the grid, they are unsafe to synchronize. That is because some of the UPS units would synchronize forward and some of the UPS units would synchronize backward. While it is reasonably safe to assume that UPS units sharing a common load bus will have output voltage vectors spread over a narrow area but there will be variations due to different loads in ring-bus configuration and errors in hard-parallel configuration. This spread means that if angle synchronization is engaged near 180 degrees some UPS units will choose a clockwise rotation and others will choose a negative rotation to complete the synchronization. If this happens, the different UPS units output voltage vectors diverge before re-converging.

If the UPS unit 110 is 180 degrees out of phase of the grid the UPS unit 110 may decrease its frequency to reduce the angle difference between the UPS unit 110 and the grid 300 down to zero or it may increase its frequency and increase the angle difference to 360 degrees, which is the same as 0 degrees. Uncertainty thus occurs in this situation. In some example embodiments, an angle inhibit band is proposed to tackle with the ambiguity when there is about 180 degree between the phase of UPS unit 110 and the phase of the grid 300. The angle inhibit band is set close to the 180 degrees. If the controller of the UPS unit determines that the UPS unit is close to 180 degrees out of the phase of the grid (for example, 170 degrees) to fall in the angle inhibit band, a drift frequency may be produced to help push the UPS unit away from the 180 degree point.

In some example embodiments, wherein in response to determining a difference of a phase angle between the corresponding UPS unit and the grid is within an angle inhibit band, applying a drift frequency to the frequency of the UPS unit. In this way, the phase of the UPS unit 110 is far enough away from the 180 degrees, and then the UPS unit 110 can determine whether to increase or decrease the phase. Therefore, which way to synchronize would be clear and would not cause ambiguity. Only then once the phase of the UPS 110 is far enough away from 180 degrees will the controller 108 decide which way to synchronize.

In some example embodiment, the angle inhibit band may be selected as a range around 180 degree and such a range is selected from 5 to 15 degrees. In a further example embodiment, the range may be 10 degrees around 180 degrees (which means an angle between +170 and −170 degrees). It is to be understood that the value of angles described herein is merely an example and the specific values are not limited to embodiments of the present disclosure.

The uninterruptible power supply 100 may further comprise a series reactor 106 coupled between the switch 102 and the load 200 and configured to isolate the load from power source disturbances to decouple the negative effects brought about by the disturbances such as harmonics and voltage unbalance.

In some embodiments, the communication link may be a common communication bus. In some embodiments, the communication connection 103 may comprise a physical connection based on fiber optic. Alternatively, in other embodiments, the physical connection is based on a twisted pair connection. The communication connection 103 enables a high speed, long distance communication connection with low latency.

In another aspect, the present disclosure relates to a corresponding uninterruptible power supply 100. It should be understood that the method described herein with reference to FIG. 3 can be used in conjunction with the controller 108 of the uninterruptible power supply 100. For the sake of brevity, more details of will not be repeated herein.

Compared to the conventional approaches, the controller of each UPS unit in a parallel UPS system according to the present disclosure couples with the controller of other UPS units to coordinate control activities without any supervisory or system-level controller. The method disclosed herein can operate in parallel configuration especially in hard-parallel and ring-bus parallel configurations. In this way, the usage scope can be expanded. For example, the UPS units 110 can be installed in a parallel configuration over a wider distance.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of regulating frequencies of a plurality of uninterruptible power supply (UPS) units, each of the plurality of UPS units comprising a controller, the method comprising:

broadcasting an expected synchronization direction, by a respective controller of each of the plurality of UPS units, to other UPS units of the plurality of UPS units via a communication link, the expected synchronization direction being determined based on a frequency of a corresponding UPS unit of the plurality of UPS units and a frequency of a grid;

wherein the expected synchronization direction is one of a forward direction or a backward direction;

obtaining, by the respective controller of each of the plurality of UPS units, the expected synchronization directions of other UPS units of the plurality of UPS units via the communication link;

determining, by the respective controller of each of the plurality of UPS units, a major synchronization direction based on the expected synchronization direction of each UPS unit of the plurality of UPS units;

wherein the major synchronization direction is one of the forward direction or the backward direction based on which represents a majority of the expected synchronization directions for the plurality of UPS units; and regulating, by the respective controller of each of the plurality of UPS units, a frequency of the corresponding UPS unit of the plurality of UPS units based on the major synchronization direction.

2. The method of claim 1, wherein in response to determining a difference of a phase angle between the corresponding UPS unit of the plurality of UPS units and the grid is within an angle inhibit band, applying, by the respective controller of each of the plurality of UPS units, a drift frequency to the frequency of the corresponding UPS unit of the plurality of UPS units, the angle inhibit band being within a range from 180 degrees.

3. The method of claim 1, wherein regulating the frequency of each UPS unit of the plurality of UPS units comprises:

in response to determining that the frequency of the corresponding UPS unit of the plurality of UPS units is greater than the frequency of the grid, decreasing the frequency of the corresponding UPS unit of the plurality of UPS units to the same of the frequency of the grid.

4. The method of claim 1, wherein regulating the frequency of each UPS unit of the plurality of UPS units comprises:

in response to determining that the frequency of the corresponding UPS unit of the plurality of UPS units is smaller than the frequency of the grid, increasing the frequency of the corresponding UPS unit of the plurality of UPS units to the same of the frequency of the grid.

5. The method of claim 2, wherein the range is selected from 5 to 15 degrees.

6. The method of claim 1, wherein the communication link is a communication bus.

7. An uninterruptible power supply (UPS) comprising:

a switch arranged between a load and a power source, the power source configured to supply power to the load;

a power management module comprising a main energy storage;

an inverter arranged between and coupled to the power management module and the load; and a controller coupled to the power management module, the inverter and the switch, the controller configured to:

broadcast an expected synchronization direction to other UPS units via a communication link, the expected synchronization direction being determined based on a frequency of the UPS and a frequency of a grid;

wherein the expected synchronization direction is one of a forward direction or a backward direction;

obtain expected synchronization directions of the other UPS units via the communication link;

determine a major synchronization direction based on the expected synchronization direction of the UPS and based on the expected synchronization directions of the other UPS units;

wherein the major synchronization direction is one of the forward direction or the backward direction based on which represents a majority of the expected synchronization directions of the UPS and the other UPS units; and regulate a frequency of the UPS based on the major synchronization direction.

8. The uninterruptible power supply of claim 7, wherein the controller is configured to apply a drift frequency to the frequency of the UPS in response to determining a difference of a phase angle between the UPS and the grid is within an angle inhibit band, the angle inhibit band being within a range from 180 degrees.

9. The uninterruptible power supply of claim 7, wherein the controller is further configured to:

decrease the frequency of the UPS unit to the same of the frequency of the grid in response to determining that the frequency of the UPS unit is greater than the frequency of the grid.

10. The uninterruptible power supply of claim 7, wherein the controller is further configured to:

increase the frequency of the UPS unit to the same of the frequency of the grid in response to determining that the frequency of the UPS is smaller than the frequency of the grid.

11. The uninterruptible power supply of claim 8, wherein the range is selected from 5 to 15 degrees.

12. The uninterruptible power supply of claim 7, wherein the communication link is a communication bus.

* * * * *